(12) United States Patent
Zastrozynski (10) Patent No.: US 8,371,774 B2
(45) Date of Patent: Feb. 12, 2013

(54) CUTTING INSERT FOR MACHINING A WORKPIECE

(75) Inventor: Jürgen Zastrozynski, Düsseldorf (DE)

(73) Assignee: Kennametal Widia Produktions GmbH & Co. KG, Essen (DE)

( * ) Notice: Subject to any disclaimer, the term of this patent is extended or adjusted under 35 U.S.C. 154(b) by 532 days.

(21) Appl. No.: 12/272,383

(22) Filed: Nov. 17, 2008

(65) Prior Publication Data
US 2009/0290946 A1    Nov. 26, 2009

Related U.S. Application Data

(63) Continuation-in-part of application No. PCT/DE2007/000703, filed on Apr. 20, 2007.

(30) Foreign Application Priority Data

May 18, 2006 (DE) .......................... 10 2006 023 740

(51) Int. Cl.
*B23B 27/02* (2006.01)
*B23B 27/22* (2006.01)
(52) U.S. Cl. ........................................ 407/113; 407/114
(58) Field of Classification Search .................. 407/113, 407/114, 115, 116
See application file for complete search history.

(56) References Cited

U.S. PATENT DOCUMENTS

| | | | | |
|---|---|---|---|---|
| 4,812,087 A | * | 3/1989 | Stashko | 407/42 |
| 5,032,049 A | * | 7/1991 | Hessman et al. | 407/113 |
| 5,052,863 A | * | 10/1991 | Satran | 407/113 |
| 5,382,118 A | * | 1/1995 | Satran et al. | 407/42 |
| 5,383,750 A | * | 1/1995 | Satran et al. | 407/113 |
| 5,441,370 A | * | 8/1995 | Pantzar et al. | 407/113 |
| 5,513,931 A | * | 5/1996 | Reiterman et al. | 407/113 |
| 5,597,271 A | * | 1/1997 | Men et al. | 407/113 |
| 5,727,911 A | * | 3/1998 | Satran et al. | 407/42 |
| 5,876,154 A | * | 3/1999 | Enderle | 407/114 |
| 6,053,671 A | * | 4/2000 | Stedt et al. | 407/35 |
| 6,171,031 B1 | | 1/2001 | LaFlamme | |
| 6,530,726 B2 | * | 3/2003 | Nelson | 407/114 |
| 6,877,935 B2 | * | 4/2005 | Schlemmer et al. | 407/66 |
| 7,264,425 B1 | * | 9/2007 | Viol et al. | 407/113 |
| 7,815,402 B2 | * | 10/2010 | Yoshida et al. | 407/113 |
| 2002/0094245 A1 | * | 7/2002 | Schlemmer et al. | 407/66 |

(Continued)

FOREIGN PATENT DOCUMENTS

EP    0 125 568        11/1984
EP    0 125 568 A1    11/1984

(Continued)

OTHER PUBLICATIONS

International Search Report PCT/DE2007/000703 and English translation thereof.

*Primary Examiner* — Will Fridie, Jr.
(74) *Attorney, Agent, or Firm* — Larry R. Meenan, Esq.

(57) ABSTRACT

A cutting insert for machining a workpiece. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

14 Claims, 10 Drawing Sheets

U.S. PATENT DOCUMENTS

| | | |
|---|---|---|
| 2003/0145904 A1 | 8/2003 | Monyak et al. |
| 2004/0265074 A1* | 12/2004 | Hessman et al. ............. 407/113 |
| 2007/0189863 A1 | 8/2007 | Viol |

FOREIGN PATENT DOCUMENTS

| | | |
|---|---|---|
| EP | 1 224 992 | 7/2002 |
| EP | 1 224 992 A2 | 7/2002 |
| JP | 57-126904 U1 | 1/1956 |
| JP | 56011247 | 2/1981 |
| JP | 63044575 | 2/1988 |
| JP | 64-56903 U1 | 4/1989 |
| JP | 07 060512 | 3/1995 |
| JP | 07 060512 A | 3/1995 |
| JP | 09 255724 | 9/1997 |
| JP | 09 255724 A | 9/1997 |
| JP | 2003334716 | 11/2003 |

* cited by examiner

CUTTING INSERT FOR MACHINING A WORKPIECE

CONTINUING APPLICATION DATA

This application is a Continuation-In-Part application of International Patent Application No. PCT/DE2007/000703 filed on Apr. 20, 2007, which claims priority from Federal Republic of Germany Patent Application No. 10 2006 023 740.4, filed on May 18, 2006. International Patent Application No. PCT/DE2007/000703 was pending as of the filing date of this application. The United States was an elected state in International Patent Application No. PCT/DE2007/000703.

BACKGROUND

1. Technical Field

The present application relates to a cutting insert having a bearing surface and a rake face at a distance therefrom and at least one flank arranged at a positive clearance angle, said rake face and flank forming an encircling round or polygonal cutting edge, and having at least one cutting edge point at a maximum distance from a plane in which the bearing surface lies, and having at least one cutting edge point at a minimum distance from the same plane.

2. Background Information

Background information is for informational purposes only and does not necessarily admit that subsequently mentioned information and publications are prior art.

The cutting inserts described above include the "positive cutting inserts" which in plan view can be circular, essentially triangular, quadrilateral, possibly square, rhombic or rectangular. The cutting edge is formed by the adjoining rake face and one or more flanks. In the simplest case, the rake face is of planar design, i.e. the rake angle is zero degrees.

Some types of cutting inserts have a sloping side which adjoins the cutting edge on the rake face, thereby forming a positive rake angle. Some types of cutting edges have a wave-like design, adjoining which are rake face sections of wave-like design. Finally, cutting edge rounding or the arrangement of a bevel at a positive or negative angle may be utilized in order to essentially restrict or minimize chipping of a cutting edge.

To machine some surfaces, such as the running surfaces of railroad wheels, cutting inserts may be used which have a circular cutting edge of constant height and a constant positive clearance angle. The frustoconical cutting inserts are used for facing the running surfaces. After wear of the actively used cutting edge, the cutting inserts can be arranged such as to be shifted in the tool carrier by a rotation angle of ninety degrees or one hundred twenty degrees depending on the original cutting depth, after which a new unused cutting edge region can be utilized.

Indexable inserts of the type described, having a circular cutting edge of constant height, disadvantageously tend to vibrate, or "chatter," during the machining operation. Due to these uncontrolled vibratory movements during the machining, irregularities (chatter marks) are produced on the surface of the machined workpiece. Apart from this poor surface quality of the machined workpiece, the service life of such indexable inserts proves to be relatively short.

Also known in principle are indexable inserts of the type mentioned at the beginning in which the cutting edge or one of the cutting edges has a maxima and cutting edges, in each case sloping therefrom on both sides, down to a cutting edge minimum. However, unlike in the case of negative cutting inserts having a clearance angle of zero degrees, lowering of the cutting edge in regions acts on the existing flank in such a way that the original cutting edge shape is changed.

Some tools have a toolholder having at least one recess for accommodating and for fastening a cutting insert of the type described above. Depending on the machining operation selected, effective rake angles can also be set via the arrangement of the cutting insert in the toolholder, which rake angles can be varied within limits in the axial and radial directions by tilting the cutting insert.

OBJECT OR OBJECTS

The object of the present application is to provide a cutting insert and a tool, comprising a toolholder and a cutting insert, which has very low or minimized rate of wear and with which an improved surface quality of the workpiece can be produced.

SUMMARY

This object may be achieved by a cutting insert having a bearing surface and a rake face at a distance therefrom, and at least one flank arranged at a positive clearance angle. The rake face and flank form an encircling round or polygonal cutting edge, and have at least one cutting edge point at a maximum distance from a plane in which the bearing surface lies. The rake face and flank have at least one cutting edge point at a minimum distance from the same plane, wherein the geometrical location of each cutting edge point, but at least the cutting edge point at a minimum distance and points adjacent thereto, is the intersection between a vertical enveloping surface and a plane parallel or virtually parallel to the bearing surface. The vertical enveloping surface is arranged perpendicularly or virtually perpendicularly to the bearing surface and is formed by a number of vertical lines which are parallel or virtually parallel to one another and which form an ideal theoretical round or polygonal cutting edge curve profile in the plane which is parallel or virtually parallel to the bearing surface and in which the point at a maximum distance from the bearing surface plane lies. The object may also be achieved by a tool, comprising a toolholder comprising at least one recess for accommodating and for fastening a cutting insert having a bearing surface and a rake face at a distance therefrom, and at least one flank arranged at a positive clearance angle. The rake face and flank form an encircling round or polygonal cutting edge, and have at least one cutting edge point at a maximum distance from a plane in which the bearing surface lies. The rake face and flank have at least one cutting edge point at a minimum distance from the same plane. The cutting insert in the toolholder is inclined at a setting angle axially and/or radially to the surface, to be machined, of a workpiece or a surface tangential thereto, wherein the geometrical location of each cutting edge point is the intersection between a vertical enveloping surface and a plane parallel or virtually parallel to a vertical plane to the surface, to be machined, of the workpiece or to a surface tangential thereto, the vertical enveloping surface being arranged perpendicularly or virtually perpendicularly to said vertical plane and being formed by a number of vertical lines which are parallel or virtually parallel to one another and which form an ideal theoretical round or polygonal cutting edge curve profile in the plane which is parallel or virtually parallel to the vertical plane and in which the point at a maximum distance from the vertical plane lies. Further developments of the cutting insert are disclosed according to at least one possible embodiment of the present application.

According to at least one possible embodiment, the geometrical location of each cutting edge point, but at least of the cutting edge points at a minimum distance from the bearing surface or of adjacent cutting edge points at a minimum distance from the bearing surface, lies at the intersection between a vertical enveloping surface and a plane parallel or virtually parallel to the bearing surface, the vertical enveloping surface being arranged perpendicularly or virtually perpendicularly to the bearing surface and being formed by a number of vertical lines which are parallel to one another and which form an ideal theoretical round or polygonal cutting edge curve profile in the plane which is parallel or virtually parallel to the bearing surface and in which the point at a maximum distance from the bearing surface plane lies.

The geometry described is most simply explained with reference to a positive cutting insert having a rake face which is circular in plan view. First, compared with a frustoconical shape, the design of the curvature of the cutting edge is changed in such a way that the cutting edge runs at least two maxima with minima in between, the highest and the deepest point, respectively, of the cutting edge profile determine the respective curvature of the cutting edge. However, the cutting edge at the desired minima is not lowered along the flank, but rather vertically to the bearing surface, such that the rake face in this lowered region is widened relative to the original rake face. The degree of widening is all the greater, the deeper the degree of the cutting point lowering is. The same accordingly also applies to the other cutting edge points which assume corresponding intermediate positions. By means of this measure, the cutting edge profile on the rake face is adapted in terms of design to the curved profile of the newly created cutting edge, wherein a lip acting exactly or substantially like a circular cutting edge in projection is obtained.

The effective cutting edge is lengthened compared with an indexable insert having a cutting edge running in a single plane, as a result of which a smoother cut (without chattering) is essentially ensured or promoted during the machining. The workpiece surface created is accordingly smoother. Periodic vibrations of the cutting insert or of the tool can occur when the randomly selected points on the cutting edge profile assume a situationally identical position in the chip-forming process. This means that the cutting edge, at all or substantially all or some of the points of the cutting edge profile, is subjected simultaneously or substantially simultaneously to periodic loads in the chip-forming phase and load relief in the shearing phase. If the frequency of the periods coincides with the natural frequency of the tool, pronounced vibrations, the chattering already mentioned, occur. However, if random points on the cutting edge profile encounter different situations in the chip-forming process, such vibrations are suppressed, since the forces in the system are superimposed and at least partly compensate for one another.

The cutting insert, according to at least one possible embodiment, comprises an ideal circular, essentially triangular, square or rhombic cutting edge profile. That is to say that the design principle selected can be applied not only to round cutting edges in the rake face plane, but also to rectilinear or polygonal cutting edges.

The cutting insert according to the present application in at least one embodiment has at least an essentially round shape and at least two, or possibly three, cutting edge points at a maximum distance from the plane of the bearing surface. Cutting edge minima lie between the cutting edge maxima. Furthermore, the shape of the cutting inserts (as seen in plan view) is in one possible embodiment of rotationally symmetrical design. There is one hundred eighty degree rotational symmetry in the case of two cutting edge maxima, one hundred twenty degree rotational symmetry in the case of three cutting edge maxima, etc.

The positive clearance angle is selected to be, in one possible embodiment, between two degrees and fifteen degrees, possibly up to at most ten degrees.

The vertical distance, measured in the direction of the bearing surface, of the point at a maximum distance from the point at a minimum distance is at least 0.5 millimeter and/or at most three millimeters, possibly at most two millimeters.

The rake angles of the cutting insert may either be constant or substantially constant over the entire cutting edge profile, in this case they are, in one possible embodiment, around two degrees to twenty-five degrees, or may vary along the cutting edge. According to a further configuration of the present application, the annular rake face region furthest away from the cutting edge lies in a plane parallel or virtually parallel to the bearing surface.

Finally, the single flank may be designed as a frustum lateral surface at a constant or substantially constant angle, or individual flank regions may be designed as planes below the cutting edge. According to one possible embodiment of the present application, however, the flank regions are divided into two zones, of which one is adjacent to the cutting edge and the other is adjacent to the bearing surface. The two flank zones enclose an angle less than one hundred eighty degrees, i.e. the flank zone further away from the cutting edge is arranged at a larger clearance angle.

The present application also relates to a tool, comprising a toolholder comprising at least one recess for accommodating and for fastening a cutting insert having a bearing surface and a rake face at a distance therefrom and at least one flank arranged at a positive clearance angle, said rake face and flank forming an encircling round or polygonal cutting edge, and having at least one cutting edge point at a maximum distance from a plane in which the bearing surface lies, and having at least one cutting edge point at a minimum distance from the same plane, the cutting insert in the toolholder being inclined at a setting angle axially and/or radially to the surface, to be machined, of a workpiece or a surface tangential thereto. According to the present application, the geometrical location of each cutting edge point is the intersection between a vertical enveloping surface and a plane parallel or virtually parallel to a vertical plane to the surface, to be machined, of the workpiece or to a surface tangential thereto, the vertical enveloping surface being arranged perpendicularly or virtually perpendicularly to said vertical plane and being formed by a number of vertical lines which are parallel or virtually parallel to one another and which form an ideal theoretical round or polygonal cutting edge curve profile in the plane which is parallel or virtually parallel to the vertical plane and in which the point at a maximum distance from the vertical plane lies. In principle, the same as what has been stated for the cutting insert described above applies to this tool; here, however, the reference to the bearing surface, this reference being applicable to vertically positioned cutting inserts, is replaced by a corresponding vertical surface to the machining plane of the workpiece or to a tangential surface to the machining point of the workpiece. In other words, the degree of tilting of the cutting insert can be included in the cutting edge correction.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Further advantages of possible embodiments are discussed below with reference to drawings, in which.

DESCRIPTION OF EMBODIMENT OR EMBODIMENTS

Figure 1:
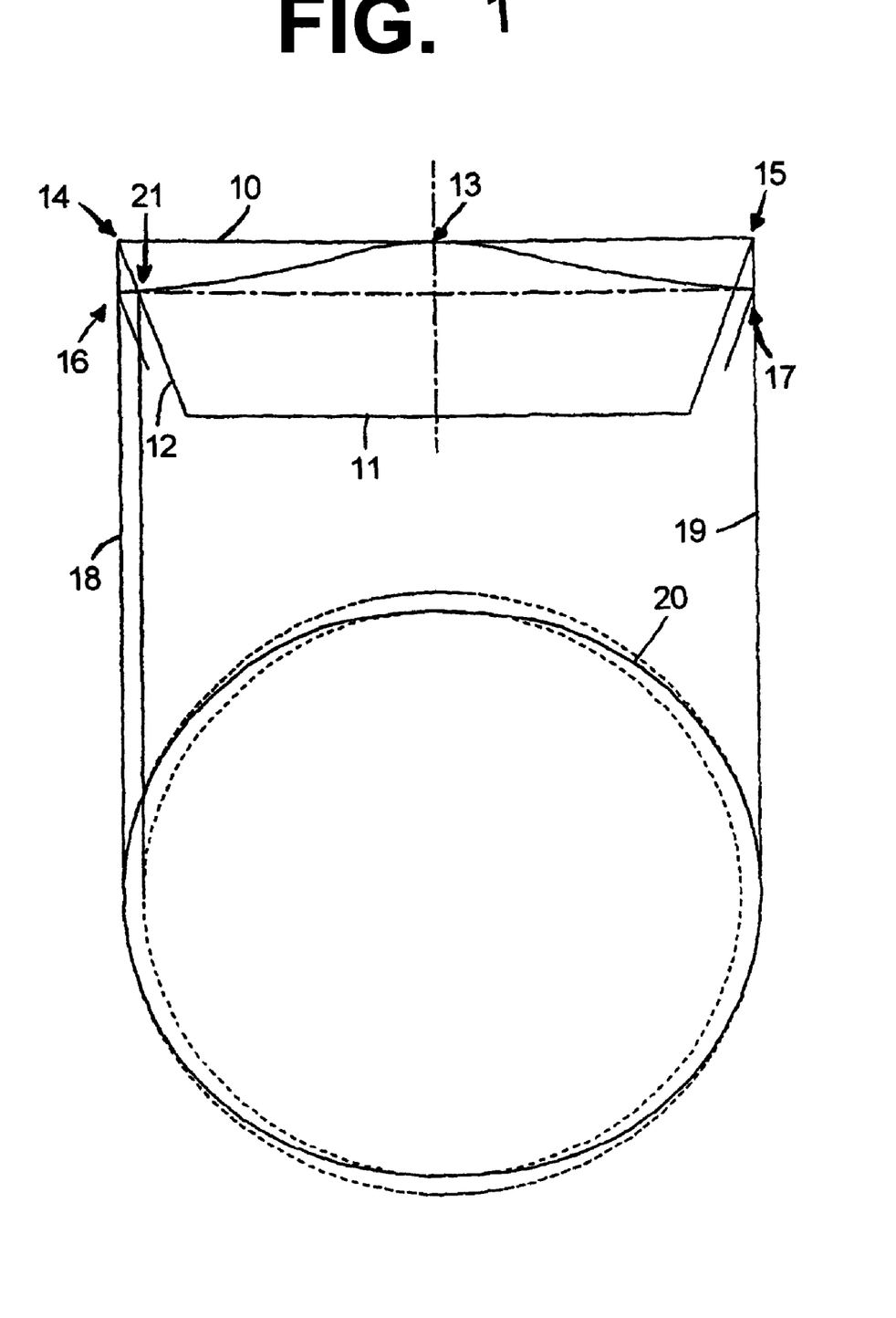
FIG. 1 shows a sketch explaining the design principle.

The configuration according to at least one possible embodiment can be seen most clearly with reference to FIG. 1, in which a frustoconical cutting insert is adopted as parent body, which has a planar rake face 10, a bearing surface 11 which is arranged parallel or virtually parallel thereto, and a flank 12, arranged round at an identical clearance angle, as lateral surface of the frustum. The cutting edge profile of such a cutting insert, which defines the plane 10, is circular.

With a cutting edge maximum 13 being maintained, the cutting edge points 14 and 15 are now lowered to the point 16 or 17, respectively, which lies on a vertical 18 or 19, respectively, to the plane in which the bearing surface 11 is arranged. In a corresponding manner, the other cutting edge points between the points 13 and 14 or 13 and 15 are lowered in a varying manner, a curved cutting edge being obtained which forms a cutting plane which is illustrated by reference numeral 20 and which, despite the nonplanar cutting edge contour, produces a lip acting exactly or substantially like a circular cutting edge in projection.

The number of maxima 13 in the cutting edge profile can be selected as desired, provided a sufficiently long effective cutting edge is retained. The precise or general dimensions of the curvature of the cutting edge result from the design relationship which is determined by the highest point 13 and the lowest point 16 or 17 of the cutting edge profile. If a horizontal section is placed directly below the lowest point of the cutting edge plane, a convex, noncircular profile of the outer contour is obtained, since the flank point 21 which would have resulted if the flank were maintained in the original size is displaced outward to point 16. In the case shown, in which the round indexable insert has two maxima 13 in plan view, the narrowest location of the outer contour corresponds to the cutting maxima 13 and the widest location of the outer contour coincides with the deepest location of the cutting edge (point 16), which thus deviates from the ideal circular shape in this section plane (parallel or virtually parallel to the bearing surface).

The design principle described above can be applied to any indexable insert having sloping cutting edges, that is to say also in the case of square, rectangular or rhombic indexable inserts. The correction of the cutting edge essentially ensures or promotes that an exactly rectilinear profile of the cutting edge or generally rectilinear profile of the cutting edge is produced in the application even in the case of sloping cutting edges.

Figure 1A:
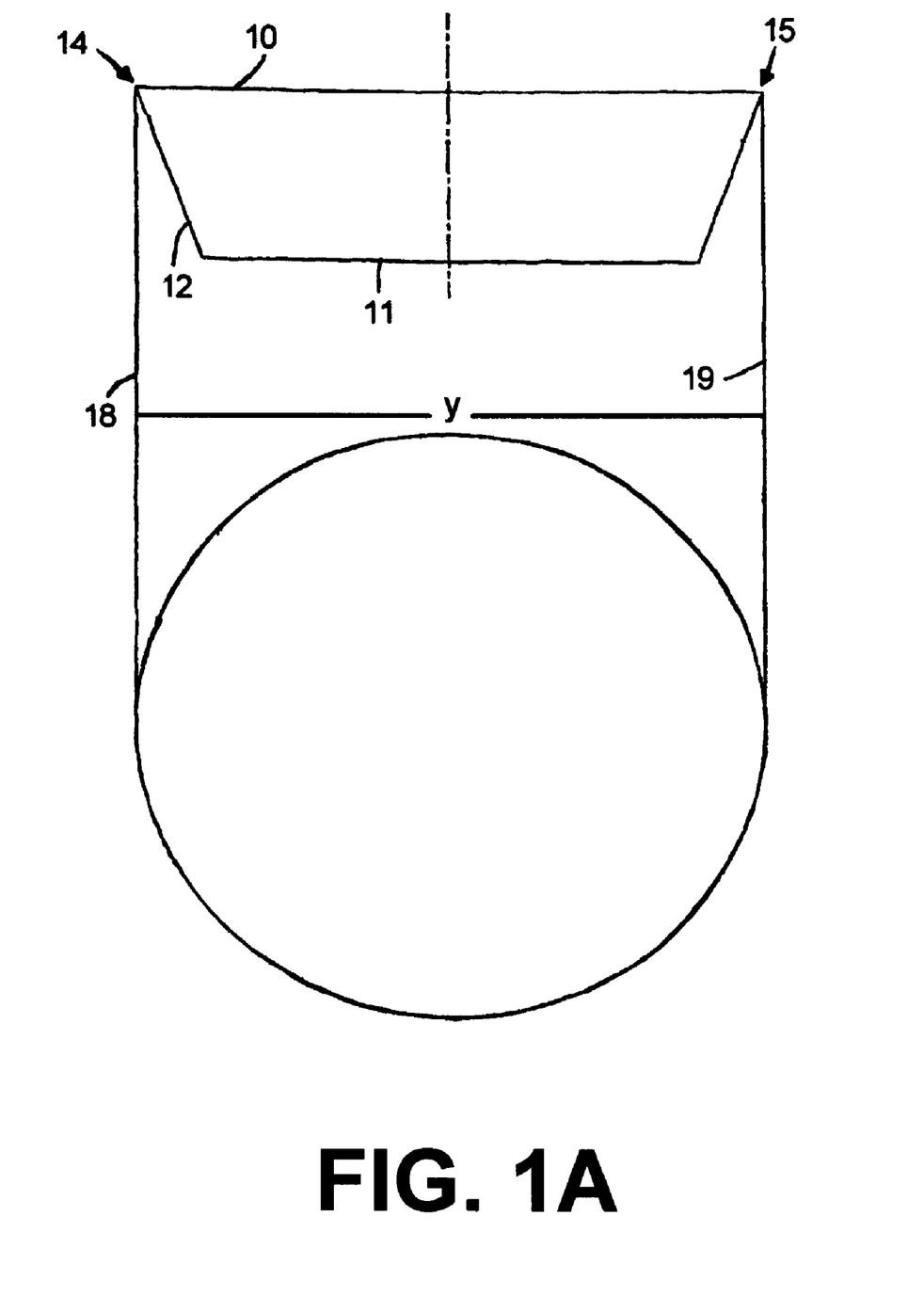
FIGS. 1A, 1B, and 1C show additional sketches of the three different portions of FIG. 1.
Figure 1B:
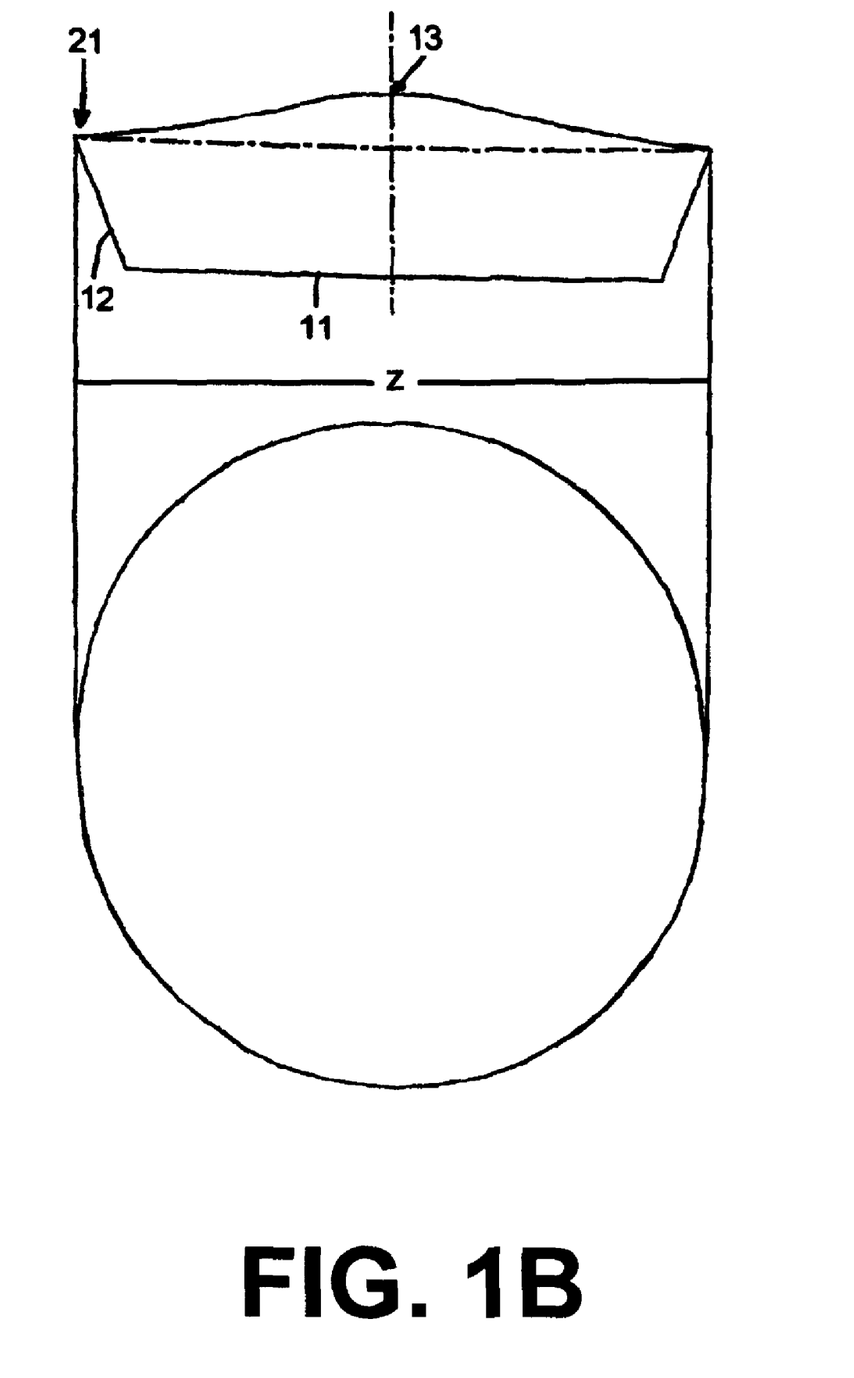
Figure 1C:
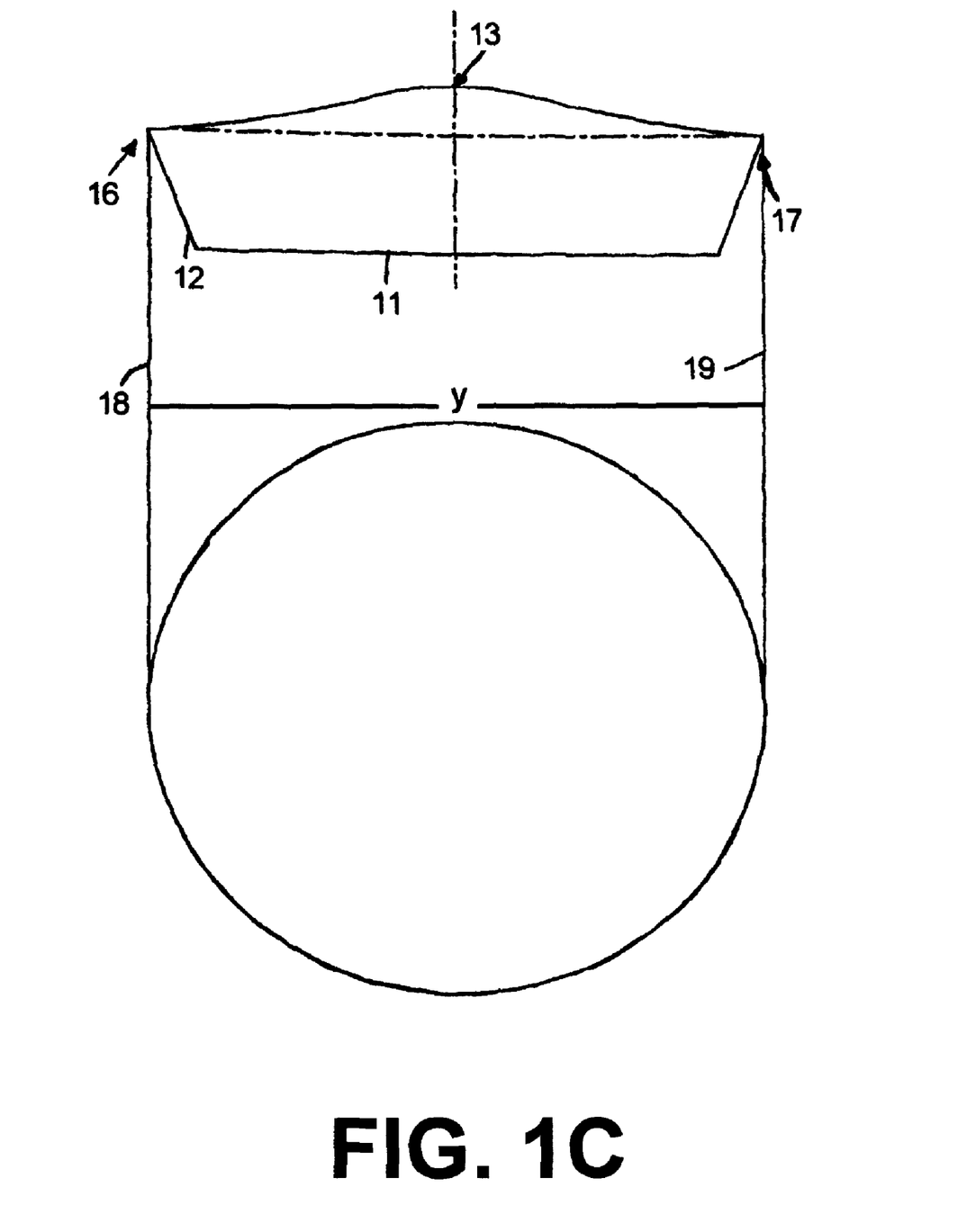

FIGS. 1A, 1B, and 1C show additional sketches of the three different portions of FIG. 1. FIG. 1A shows a view of a frustoconical cutting insert. The cutting insert has a diameter y. A circular cutting edge runs around the perimeter of the planar rake face 10. FIG. 1B shows another view of the cutting insert shown in FIG. 1A. However, portions of the cutting insert have been removed such that portions of the cutting edge are disposed at different heights as seen in FIG. 1B. Since the cutting insert has a smaller diameter z at the lower portions of the cutting edge than the diameter y at the upper portions of the cutting edge, the cutting edge now has an elliptical or oval shape when viewing the planar rake face 10, as shown in FIG. 1B, which may be undesirable. As shown in FIG. 1C, the design of the cutting insert may be modified such that the cutting edge retains a substantially circular shape when viewing the planar rake face 10, which circular shape has the same diameter y as the circular cutting edge in FIG. 1A. For example, the lower cutting edge points 16 and 17 may be displaced radially outwardly such that they are the same radial distance from the center or central axis as the higher cutting edge point 13. Points on the sections of cutting edge which slope from the high points to the low points may be gradually displaced radially outwardly to maintain the circular shape of a cutting edge. All points on the cutting edge consequently are located in a cylindrical plane disposed about and parallel to the central axis of the cutting insert.

Figure 2:
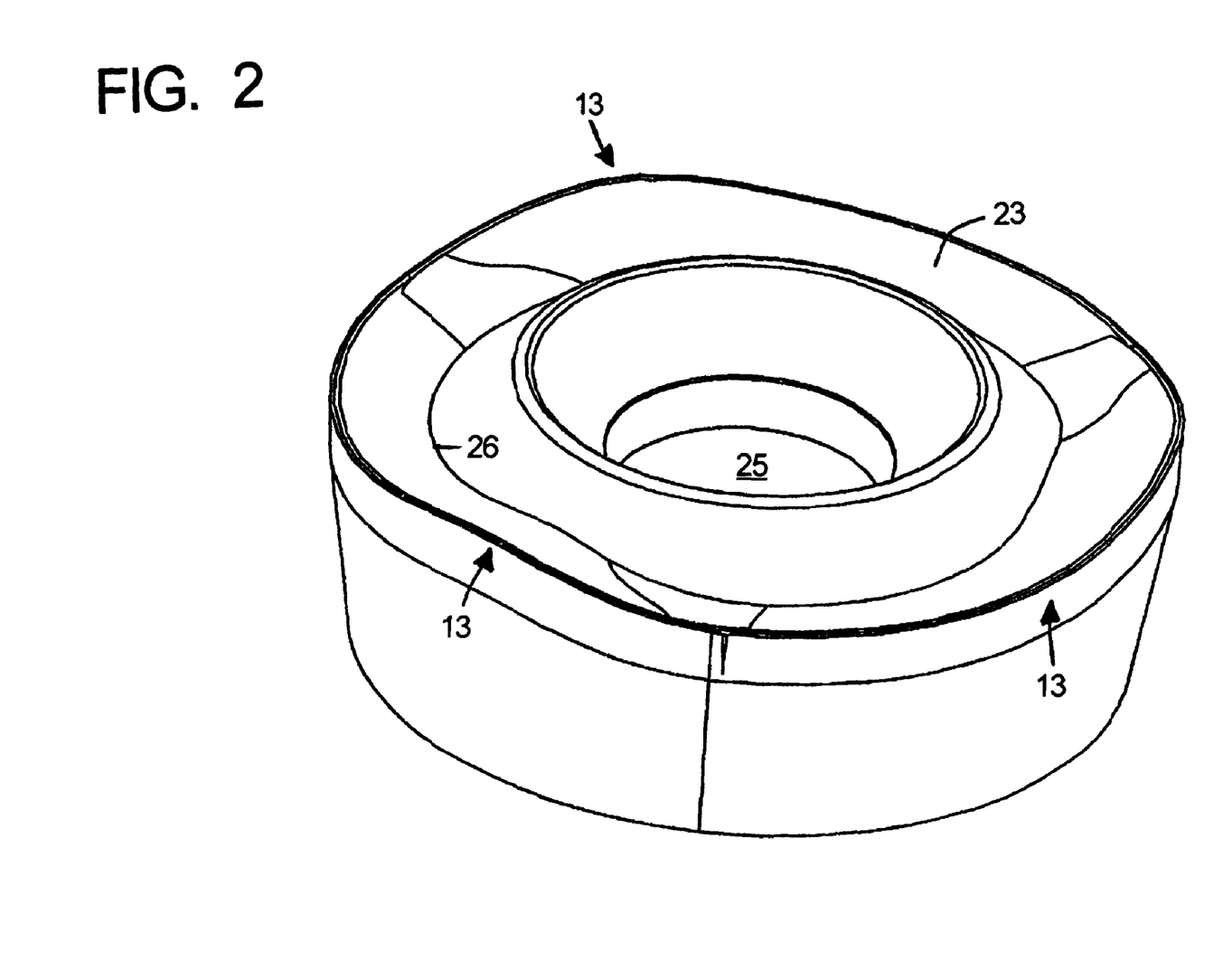
FIG. 2 shows a perspective view of a cutting insert according to at least one possible embodiment.
Figure 3:
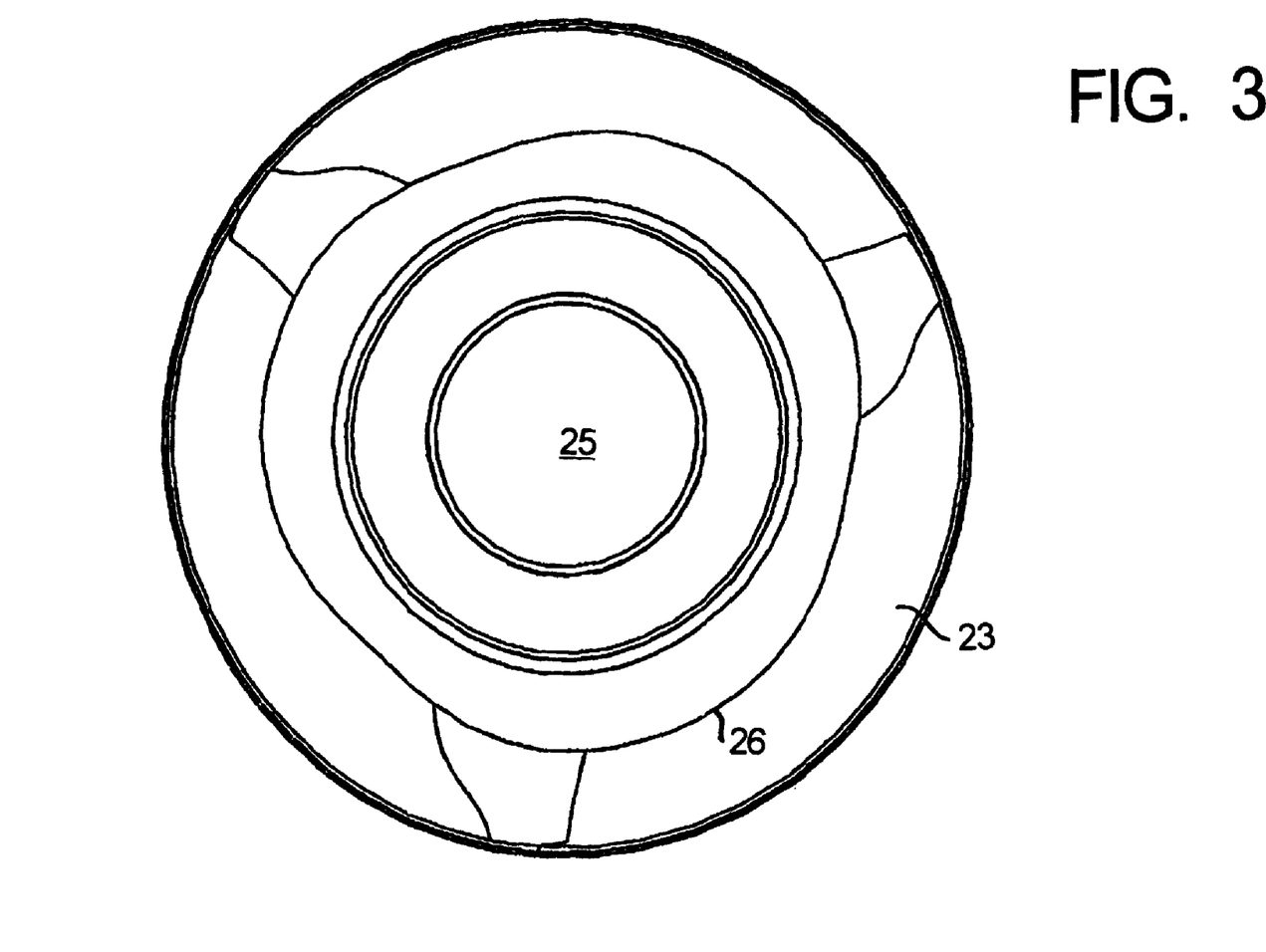
FIG. 3 shows a side view of the cutting insert according to FIG. 2.
Figure 4:
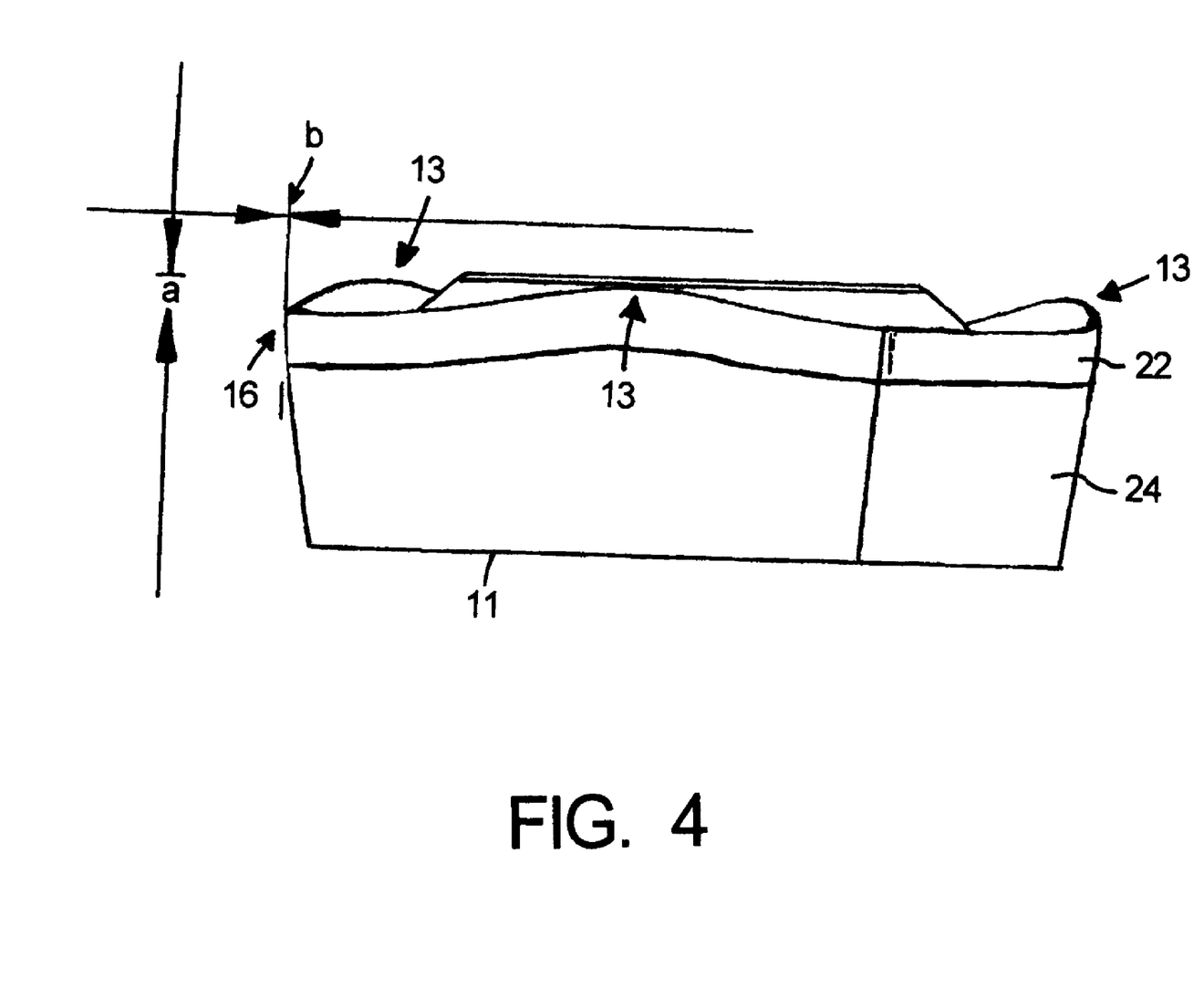
FIG. 4 shows a plan view of the rake face of the cutting insert according to FIG. 2.

FIGS. 2 to 4 show a cutting insert which is circular in plan view and which has three cutting edge maxima 13 and cutting edge minima in between. The cutting edge runs in a curved manner in the space and is defined or formed by an encircling flank 22 at a positive clearance angle on the one hand and by a rake region 23, designed to slope continuously, on the other hand.

The lower flank region 24, which lies above the bearing surface 11, is inclined at a steeper clearance angle than the flank region 22. The cutting insert has a central fastening hole 25 for accommodating a clamping screw. The dimension a in FIG. 4 illustrating the distance between the cutting edge point 16 and the cutting edge point 13 shows the degree of lowering. If the design of the cutting edge profile is oriented with reference to the maximum 13 and the lowering point 16, the degree of deviation, designated by b, from the ideal circular shape can be reduced to a minimum (within the micrometer range).

As becomes clear in one possible embodiment with reference to FIG. 2, the rake angle course along the cutting edge depends on whether the line 26 visible in FIG. 3, which line 26 determines the end of the sloping rake face region 23, lies in one plane, in this case different rake angles are obtained along the cutting edge profile depending on the lowering of the cutting edge, or the course of the curve 26 is adapted to the vertical course of the constructed cutting edge profile in space, such that the rake angles remain constant or substantially constant along the entire cutting edge.

The cutting insert is suitable in one possible embodiment for the longitudinal turning of flat faces. During an infeed of the cutting insert, first the cutting edge regions around the maximum 13 come into engagement with the workpiece, following which successively are the remaining regions in accordance with the angle of inclination of the cutting edge along the cutting edge profile. The cutting insert is therefore brought into engagement with the workpiece more gently than would be the case with a strictly frustoconical cutting insert having a planar rake face.

Figure 5:
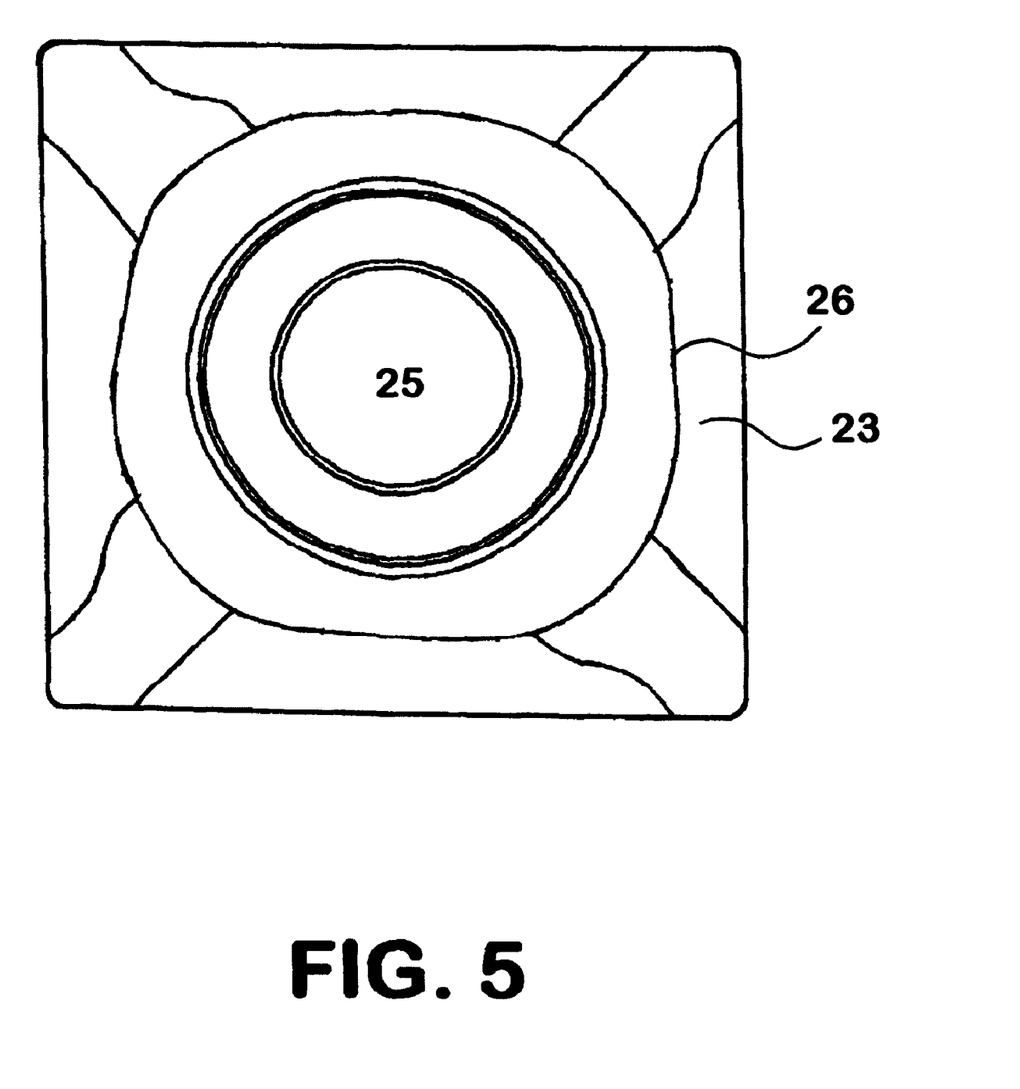
FIG. 5 shows a side view similar to that of FIG. 3, but of a polygonal cutting insert, such as a square cutting insert, according to at least one possible embodiment.

FIG. 5 shows a possible embodiment of a polygonal cutting insert, such as a square cutting insert. The view is similar to that shown in FIG. 3 for the circular or frustoconical cutting insert. The cutting insert has sloping portions 23 which end at line 26. There is also a fastening hole 25.

Figure 6:
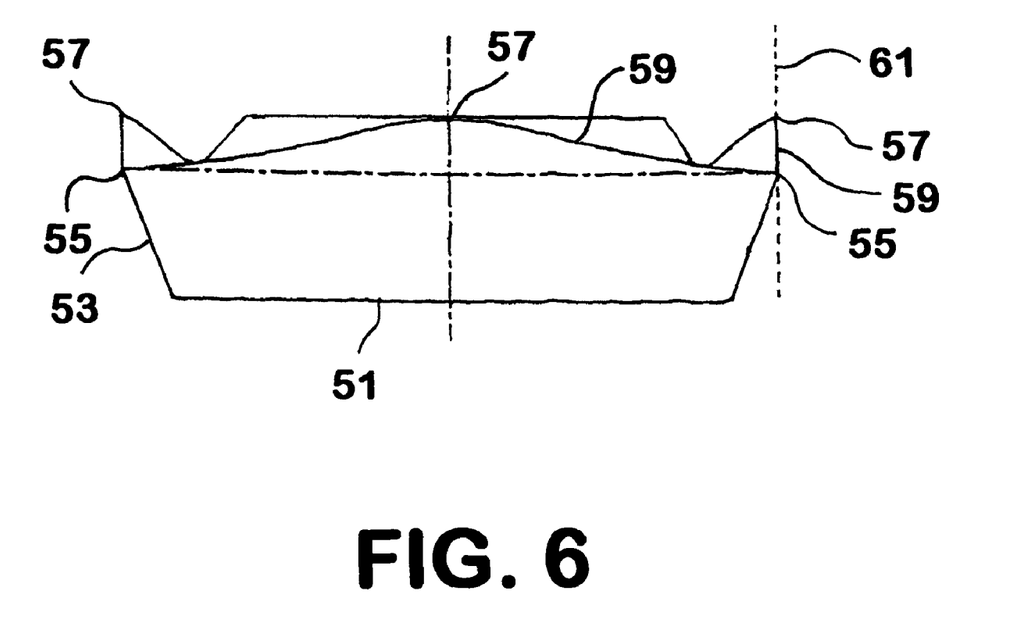
FIG. 6 shows another view of a polygonal cutting insert, such as a square cutting insert, according to at least one possible embodiment.

FIG. 6 shows another view of a polygonal cutting insert, such as a square cutting insert, according to at least one possible embodiment. The cutting insert has a bearing surface 51 and four flank surfaces 53. The cutting insert has a cutting edge with high portions 57, sloping portions 59, and low portions 55. The cutting edge, when looking along the central axis of the cutting insert, such as in the view shown in FIG. 5, has a substantially square shape. All of the points on the cutting edge on one side of the cutting insert lie in a plane 61 which runs parallel to the central axis of the cutting insert. As can be seen in FIG. 6, the points in the high portion 57, the sloping portion 59, and the low portion 55 all lie in the plane 61.

Figure 7:
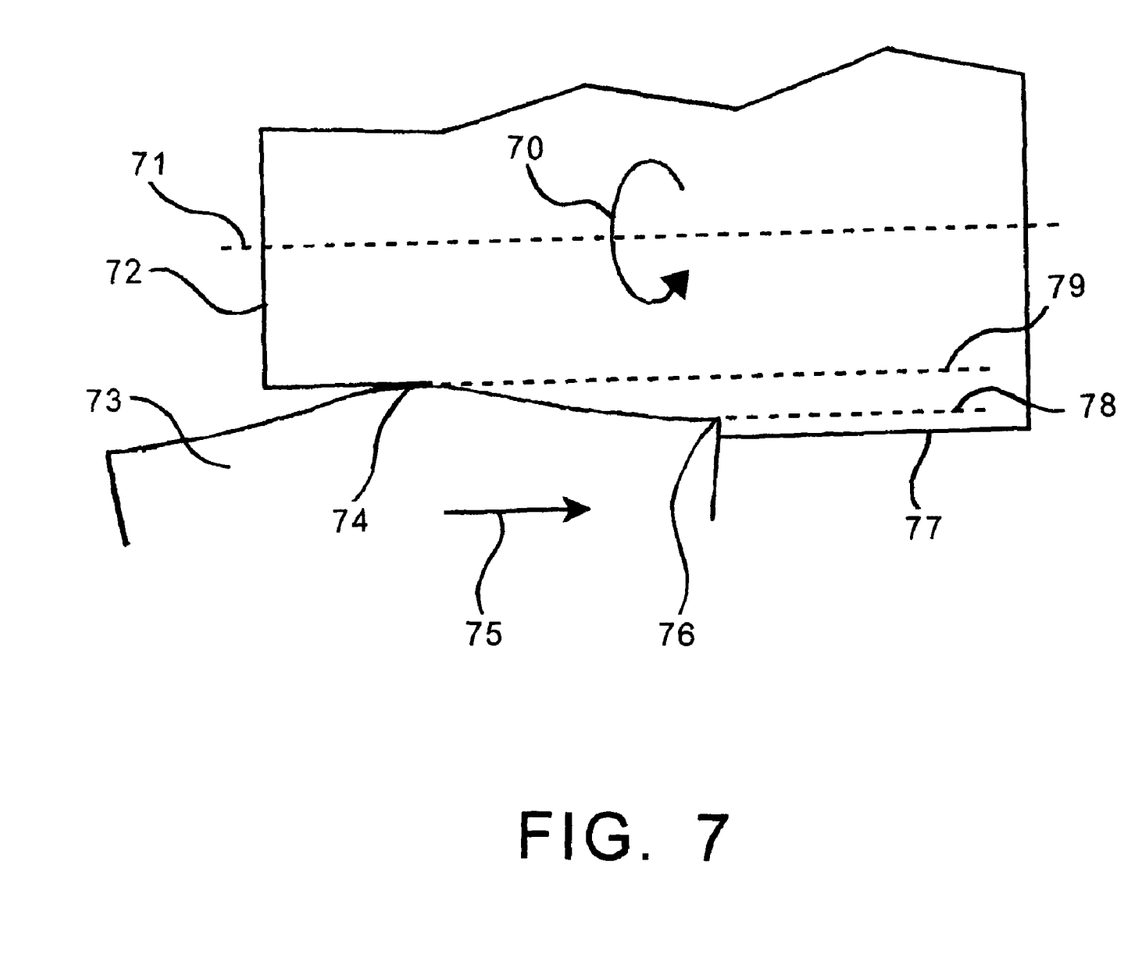
FIG. 7 shows a possible embodiment of a cutting insert cutting a workpiece.

FIG. 7 shows a possible embodiment of a cutting insert 73 according to at least one possible embodiment cutting a workpiece 72, such as a railway wheel. The cutting insert 73 has a high section 74 and a low section 76 of a polygonal or rounded cutting edge. The workpiece 72 as a rotational axis 71 which rotates about the axis 71 in the direction 70 into the cutting insert 73 which is held in a tool (not shown). The workpiece 72 has an outer surface 77. During a cutting operation, the workpiece 72 is rotated while the cutting insert 73 is advanced into engagement with the workpiece 72. After the cutting insert 73 has been advanced into the workpiece 72 to achieve a desired depth of cut 79, the cutting insert 73 is then moved parallel to the rotational axis of the workpiece 72. The low section 76 of the cutting insert 73 initially makes a shallow cut to a shallow depth of cut 78. Such a shallow initial cut produces less wear and stress is on the cutting insert 73, as well as minimizes chatter of the cutting insert 73 during the cutting process, thereby improving the quality of the cut surface. The sloped profile of the cutting edge results in a gradual increase in the depth of the cut from the shallow initial cut depth 78 to the final cut depth 79. In this manner, a deeper cut can be achieved with minimized stresses over different sections of the cutting edge. In contrast, if the entire cutting edge at a constant height, more material would be removed in a single cut by a much smaller portion of cutting edge, thereby increasing stresses and wear on the cutting insert. It should be noted that the diagram in FIG. 7 is according to at least one possible embodiment and may or may not be representative of the use or operation of the embodiments disclosed herein.

One feature or aspect of an embodiment is believed at the time if the filing of this patent application to possibly reside broadly in a cutting insert having a bearing surface 11 and a rake face at a distance therefrom and at least one flank 12 arranged at a positive clearance angle, said rake face and flank 12 forming an encircling round or polygonal cutting edge, and having at least one cutting edge point 13 at a maximum distance from a plane in which the bearing surface 11 lies, and having at least one cutting edge point 16, 17 at a minimum distance from the same plane, wherein the geometrical location of each cutting edge point, but at least the cutting edge point 16, 17 at a minimum distance and points adjacent thereto, is the intersection between a vertical enveloping surface and a plane parallel or virtually parallel to the bearing surface 11, the vertical enveloping surface being arranged perpendicularly or virtually perpendicularly to the bearing surface 11 and being formed by a number of vertical lines 18, 19 which are parallel or virtually parallel to one another and which form an ideal theoretical round or polygonal cutting edge curve profile in the plane which is parallel or virtually parallel to the bearing surface 11 and in which the point at a maximum distance from the bearing surface plane lies.

Another feature or aspect of an embodiment is believed at the time if the filing of this patent application to possibly reside broadly in the cutting insert, comprising an ideal circular, essentially triangular, square or rhombic cutting edge curve profile.

Yet another feature or aspect of an embodiment is believed at the time if the filing of this patent application to possibly reside broadly in the cutting insert, comprising an essentially round shape and at least two, often three, cutting edge points 13 at a maximum distance from the plane of the bearing surface 11.

Still another feature or aspect of an embodiment is believed at the time if the filing of this patent application to possibly reside broadly in the cutting insert, wherein the shape is of rotationally symmetrical design.

A further feature or aspect of an embodiment is believed at the time if the filing of this patent application to possibly reside broadly in the cutting insert, wherein the positive clearance angle is between two degrees and fifteen degrees, often up to at most ten degrees.

Another feature or aspect of an embodiment is believed at the time if the filing of this patent application to possibly reside broadly in the cutting insert, wherein the vertical distance (a), measured in the direction of the bearing surface 11, of the point at a maximum distance from the point at a minimum distance is at least 0.5 millimeter and/or at most three millimeters, often at most two millimeters.

Yet another feature or aspect of an embodiment is believed at the time if the filing of this patent application to possibly reside broadly in the cutting insert, wherein the rake angles are essentially constant over the entire cutting edge profile and are often two degrees to twenty-five degrees.

Still another feature or aspect of an embodiment is believed at the time if the filing of this patent application to possibly reside broadly in the cutting insert, wherein the rake angles vary along the cutting edge, wherein often the annular rake face region furthest away from the cutting edge lies in a plane substantially parallel to the bearing surface.

A further feature or aspect of an embodiment is believed at the time if the filing of this patent application to possibly reside broadly in the cutting insert, wherein a first flank region 22 is arranged below the cutting edge and a further flank region 24 having larger clearance angles is arranged therebelow adjacent to the bearing surface 11.

One feature or aspect of an embodiment is believed at the time if the filing of this patent application to possibly reside broadly in a tool, comprising a toolholder comprising at least one recess for accommodating and for fastening a cutting insert having a bearing surface 11 and a rake face at a distance therefrom and at least one flank 12 arranged at a positive clearance angle, said rake face and flank 12 forming an encircling round or polygonal cutting edge, and having at least one cutting edge point 13 at a maximum distance from a plane in which the bearing surface 11 lies, and having at least one cutting edge point 16, 17 at a minimum distance from the same plane, the cutting insert in the toolholder being inclined at a setting angle axially and/or radially to the surface, to be machined, of a workpiece or a surface tangential thereto, wherein the geometrical location of each cutting edge point is the intersection between a vertical enveloping surface and a plane substantially parallel to a vertical plane to the surface, to be machined, of the workpiece or to a surface tangential thereto, the vertical enveloping surface being arranged substantially perpendicularly to said vertical plane and being formed by a number of vertical lines which are substantially parallel to one another and which form an ideal theoretical round or polygonal cutting edge curve profile in the plane which is substantially parallel to the vertical plane and in which the point at a maximum distance from the vertical plane lies.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

The following patents are incorporated by reference as if set forth in their entirety herein: U.S. Pat. No. 7,261,620 B2 issued Aug. 28, 2007, to Boms et al., and EE00380 U1 published Jul. 15, 2003, to applicant OÜ Shipload.

All of the patents, patent applications or patent publications, which were cited in the International Search Report dated Aug. 1, 2007, and/or cited elsewhere are hereby incorporated by reference as if set forth in their entirety herein as follows: EP 1 224 992, having the following English translation of the German title "CUTTING TOOL AND INDEXABLE TIP," published on Jul. 24, 2002; EP 0 125 568, having the following English translation of the German title "INDEXABLE INSERT," published on Nov. 21, 1984; JP 07 060512, having the following English translation of the Japanese title "THROWAWAY TIP," published on Mar. 7, 1995; US 2003/145904, having the title "STUMP GRINDING BIT AND TIP THEREFOR," published Aug. 7, 2003; JP 09 255724, having the following English translation of the Japanese title "ETHYLENE POLYMER WITH EXCELLENT CLARITY, TOUGHNESS, LOW EXTRACTABLE CONTENT, AND EASINESS OF PROCESSING," published on Sep. 30, 1997; and U.S. Pat. No. 6,171,031, having the title "METHOD FOR ALTERING A CUTTING INSERT BLANK," published on Jan. 9, 2001.

The corresponding foreign and international patent publication applications, namely, Federal Republic of Germany Patent Application No. 10 2006 023 740.4, filed on May 18, 2006, having inventor Jürgen ZASTROZYNSKI, and DE-OS10 2006 023 740.4 and DE-PS 10 2006 023 740.4, and International Application No. PCT/DE2007/000703, filed on Apr. 20, 2007, having WIPO Publication No. WO 2007/134561 and inventor Jürgen ZASTROZYNSKI, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/DE2007/000703 and German Patent Application 10 2006 023 740.4 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/DE2007/000703 and DE 10 2006 023 740.4 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A cutting insert comprising:
a bearing surface and a rake surface being disposed opposite to and spaced apart from said bearing surface;
at least one flank surface being disposed between and connecting said bearing surface and said rake surface;
said at least one flank surface being disposed at an acute angle to said rake surface to form a positive clearance angle and at an obtuse angle to said bearing surface;
a round or circular cutting edge disposed about a perimeter of said rake surface;
said cutting edge including a first cutting edge point and a second cutting edge point;
said first cutting edge point located at a maximum distance from a plane parallel to said bearing surface and perpendicular to a central axis of said cutting insert;
said second cutting edge point located at a minimum distance from the plane parallel to the bearing surface,
wherein the minimum distance is less than the maximum distance; and
wherein each of said first and second cutting edge points are disposed at a radial distance from a central axis of the said cutting insert in such a way that each of said first and second cutting edge points are located in a cylindrical plane disposed about and parallel to the central axis of the cutting insert.

2. The cutting insert as claimed in claim 1, wherein:
each of said bearing surface and said rake surface is disposed transverse to said central axis; and
each of said cutting edge points is disposed equidistant from said central axis as measured perpendicularly from said central axis.

3. The cutting insert as claimed in claim 2, wherein:
said cutting edge has at least three cutting edge points disposed at a first distance from said bearing surface; and
the shape of the cutting edge is of rotationally symmetrical design.

4. The cutting insert as claimed in claim 3, wherein the positive clearance angle is one of: between 2° and 15°, and up to at most 10°.

5. The cutting insert as claimed in claim 4, wherein:
the maximum distance of a cutting edge point from the bearing surface plane is one of: at least 0.5 mm and/or at most 3 mm, and at most 2 mm, greater than the minimum distance of a cutting edge point from the bearing surface plane; and a plurality of rake angles are constant over the entire cutting edge profile and are between 2° to 25°.

6. The cutting insert as claimed in claim 5, wherein:
the rake angles vary along the cutting edge, wherein the annular rake face region furthest away from the cutting edge lies in a plane parallel to the bearing surface; and
a first flank region is arranged below the cutting edge and a further flank region having larger clearance angles is arranged therebelow adjacent to the bearing surface.

7. The cutting insert according to claim 6 in combination with a tool for machining railway wheels, said tool comprising a toolholder comprising at least one recess for accommodating and for fastening said cutting insert thereto, the cutting insert in the toolholder being inclined at a setting angle axially and/or radially to the surface to be machined of a railway wheel or a surface tangential thereto.

8. A cutting insert comprising:
a bearing surface and a rake surface being disposed opposite to and spaced apart from said bearing surface;
a plurality of flank surfaces being disposed between and connecting said bearing surface and said rake surface;
said plurality of flank surfaces being disposed at an acute angle to said rake surface to form a positive clearance angle and at an obtuse angle to said bearing surface;
a polygonal cutting edge disposed about the perimeter of said rake surface;
each side of said polygonal cutting edge including a first cutting edge point, a second cutting edge point, and a third cutting edge point located between the first and second cutting edge point;
said first cutting edge point located at a maximum distance from a plane parallel to said bearing surface and perpendicular to a central axis of said cutting insert;
said second cutting edge point located at a minimum distance from the plane parallel to said bearing surface,
said third cutting edge point located at a distance from a plane parallel to said bearing surface,
wherein the minimum distance is less than the maximum distance, and
wherein the distance of said third cutting edge point is less than the maximum distance and greater than the minimum distance, and
wherein the first, second and third cutting edge points all lie in a plane that is parallel to a central axis of said cutting insert.

9. The cutting insert as claimed in claim 8, wherein said polygonal cutting edge has an essentially triangular, square, or rhombic cutting edge profile.

10. The cutting insert as claimed in claim 9, wherein said cutting edge has at least three cutting edge points disposed at first distance from said bearing surface.

11. The cutting insert as claimed in claim 10, wherein: the shape of the cutting edge is of rotationally symmetrical design; and
the positive clearance angle is one of: between 2° and 15°, and up to at most 10°.

12. The cutting insert as claimed in claim 11, wherein:
the maximum distance of a cutting edge point from the bearing surface plane is one of: at least 0.5 mm and/or at most 3 mm, and at most 2 mm, greater than the minimum distance of a cutting edge point from the bearing surface plane; and
a plurality of rake angles are constant over the entire cutting edge profile and are between 2° to 25°.

13. The cutting insert as claimed in claim 12, wherein:
the rake angles vary along the cutting edge, wherein preferably the annular rake face region furthest away from the cutting edge lies in a plane parallel to the bearing surface; and
a first flank region is arranged below the cutting edge and a further flank region having larger clearance angles is arranged therebelow adjacent to the bearing surface.

14. The cutting insert according to claim 13 in combination with a tool for machining railway wheels, said tool comprising a toolholder comprising at least one recess for accommodating and for fastening said cutting insert thereto, the cutting insert in the toolholder being inclined at a setting angle axially and/or radially to the surface to be machined of a railway wheel or a surface tangential thereto.

* * * * *